(12) United States Patent
Kim

(10) Patent No.: US 8,279,734 B2
(45) Date of Patent: *Oct. 2, 2012

(54) RECORDING MEDIUM, READ/WRITE METHOD THEREOF AND READ/WRITE APPARATUS THEREOF

(75) Inventor: Jin Yong Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/656,844

(22) Filed: Feb. 17, 2010

(65) Prior Publication Data

US 2011/0134736 A1    Jun. 9, 2011

(51) Int. Cl.
G11B 7/00    (2006.01)

(52) U.S. Cl. ............... 369/59.25; 369/47.38; 369/47.39

(58) Field of Classification Search .................. None
See application file for complete search history.

(56) References Cited

U.S. PATENT DOCUMENTS

| | | | |
|---|---|---|---|
| 5,361,173 A | 11/1994 | Ishii et al. | |
| 5,485,469 A | 1/1996 | Suzuki | |
| 5,590,096 A | 12/1996 | Ohtsuka et al. | |
| 5,636,631 A | 6/1997 | Waitz et al. | |
| 5,764,621 A | 6/1998 | Choi | |
| 5,793,546 A | 8/1998 | Tanaka | |
| 5,835,462 A | 11/1998 | Mimnagh | |
| 5,878,020 A | 3/1999 | Takahashi | |
| 5,892,633 A | 4/1999 | Ayres et al. | |
| 5,959,962 A | 9/1999 | Matsumaru et al. | |
| 6,330,215 B1 | 12/2001 | Lim | |
| 6,415,435 B1 | 7/2002 | McIntyre | |
| 6,480,450 B1 | 11/2002 | Fujii et al. | |
| 6,487,713 B1 | 11/2002 | Cohen et al. | |
| 6,504,806 B1 | 1/2003 | Nakajo | |
| 6,535,470 B1 | 3/2003 | Wu | |
| 6,560,403 B1 | 5/2003 | Tanaka et al. | |
| 6,580,671 B1 | 6/2003 | Otomo et al. | |
| 6,600,716 B1 | 7/2003 | Kondo | |
| 6,643,233 B1 | 11/2003 | Yen et al. | |
| 6,684,328 B2 | 1/2004 | Matsuura | |
| 6,868,054 B1 | 3/2005 | Ko | 369/59.25 |
| 6,894,961 B1 | 5/2005 | Osakabe | |
| 6,996,047 B2 | 2/2006 | Nagano | |
| 6,999,393 B2 | 2/2006 | Yamada | |
| 7,012,878 B2 | 3/2006 | Shinotsuka et al. | |

(Continued)

FOREIGN PATENT DOCUMENTS

CN    1151071 A    6/1997

(Continued)

OTHER PUBLICATIONS

Chinese Patent Gazette dated Nov. 3, 2010 issued in corresponding Chinese Application No. 200580025599.3.

(Continued)

*Primary Examiner* — Joseph Haley

(74) *Attorney, Agent, or Firm* — Harness, Dickey & Pierce, P.L.C.

(57) ABSTRACT

A recording medium read/write method and apparatus are disclosed. The present invention records version information of a corresponding recording medium as read/write control information within the recording medium. The version information includes write compatibility version information and read compatibility version information. The read/write apparatus efficiently performs the read/write of the recording medium with reference to the version informations recorded within the recording medium.

16 Claims, 11 Drawing Sheets

U.S. PATENT DOCUMENTS

| | | | |
|---|---|---|---|
| 7,046,605 B1 | 5/2006 | Ko | |
| 7,075,871 B2 | 7/2006 | Kato et al. | |
| 7,088,667 B2 | 8/2006 | Kobayashi | |
| 7,151,729 B1 | 12/2006 | Park et al. | |
| 7,161,881 B2 | 1/2007 | Pereira | |
| 7,170,841 B2 | 1/2007 | Shoji et al. | |
| 7,193,948 B2 | 3/2007 | Furukawa et al. | |
| 7,212,480 B2 | 5/2007 | Shoji et al. | |
| 7,218,585 B2 | 5/2007 | Tanii et al. | |
| 7,230,907 B2 | 6/2007 | Shoji et al. | |
| 7,286,455 B2 | 10/2007 | Shoji et al. | |
| 7,369,475 B2 | 5/2008 | Nagai | |
| 7,376,072 B2 | 5/2008 | Shoji et al. | |
| 7,400,571 B2 | 7/2008 | Shoji et al. | |
| 7,423,951 B2 | 9/2008 | Shoji et al. | |
| 7,471,879 B2 | 12/2008 | Fuchigami et al. | |
| 7,650,362 B2 | 1/2010 | Suh | |
| 7,706,230 B2 | 4/2010 | Kim | |
| 2001/0044935 A1 | 11/2001 | Kitayama | |
| 2001/0053115 A1 | 12/2001 | Nobukuni et al. | |
| 2002/0021656 A1 | 2/2002 | Tsukagoshi et al. | |
| 2002/0044509 A1 | 4/2002 | Nakajima | |
| 2002/0048241 A1 | 4/2002 | Kumagai et al. | |
| 2002/0048646 A1 | 4/2002 | Tomura et al. | |
| 2002/0085470 A1 | 7/2002 | Yokoi | |
| 2002/0089919 A1 | 7/2002 | Ko et al. | |
| 2002/0126604 A1 | 9/2002 | Powelson et al. | |
| 2002/0126611 A1 | 9/2002 | Chang | |
| 2002/0150014 A1 | 10/2002 | Nijboer et al. | |
| 2002/0167880 A1 | 11/2002 | Ando et al. | |
| 2002/0172499 A1 | 11/2002 | Tozaki et al. | |
| 2003/0021201 A1 | 1/2003 | Kobayashi | |
| 2003/0021202 A1 | 1/2003 | Usui et al. | |
| 2003/0058771 A1 | 3/2003 | Furukawa et al. | |
| 2003/0067859 A1* | 4/2003 | Weijenbergh et al. | 369/59.25 |
| 2003/0067862 A1 | 4/2003 | Rilum et al. | |
| 2003/0086345 A1 | 5/2003 | Ueki | |
| 2003/0137915 A1* | 7/2003 | Shoji et al. | 369/59.25 |
| 2003/0151994 A1 | 8/2003 | Tasaka et al. | |
| 2003/0159135 A1 | 8/2003 | Hiller et al. | |
| 2003/0223339 A1 | 12/2003 | Taniguchi et al. | |
| 2003/0231567 A1 | 12/2003 | Moritomo | |
| 2004/0001407 A1 | 1/2004 | Kim et al. | |
| 2004/0004921 A1 | 1/2004 | Lee et al. | |
| 2004/0010745 A1 | 1/2004 | Lee et al. | |
| 2004/0022150 A1 | 2/2004 | Lee et al. | |
| 2004/0030962 A1 | 2/2004 | Swaine et al. | |
| 2004/0076097 A1* | 4/2004 | Sawabe et al. | 369/53.22 |
| 2004/0184395 A1 | 9/2004 | Lee et al. | 369/275.3 |
| 2005/0019023 A1 | 1/2005 | Ko | |
| 2005/0036425 A1 | 2/2005 | Suh et al. | |
| 2005/0038957 A1 | 2/2005 | Suh | |
| 2005/0254413 A1 | 11/2005 | Kim | |
| 2006/0233059 A1 | 10/2006 | Suh et al. | |
| 2007/0088954 A1 | 4/2007 | Furukawa et al. | |
| 2007/0115765 A1 | 5/2007 | Kobayashi | |
| 2007/0156953 A1 | 7/2007 | Suh | |
| 2008/0043588 A1 | 2/2008 | Suh et al. | |
| 2009/0129249 A1 | 5/2009 | Lee et al. | |

FOREIGN PATENT DOCUMENTS

| | | |
|---|---|---|
| CN | 1229503 | 9/1999 |
| CN | 1656544 A | 8/2005 |
| EP | 0 265 984 | 5/1988 |
| EP | 0506680 | 5/1991 |
| EP | 0 552 903 A2 | 1/1993 |
| EP | 0571926 | 12/1993 |
| EP | 0821817 | 2/1998 |
| EP | 0 968 769 A2 | 1/2000 |
| EP | 1 172 810 A2 | 1/2002 |
| EP | 1 244 097 A2 | 9/2002 |
| EP | 1 293 981 | 3/2003 |
| EP | 1 308 942 A2 | 5/2003 |
| EP | 1 329 888 A1 | 7/2003 |
| EP | 1 331 631 A1 | 7/2003 |
| EP | 1 361 571 A1 | 11/2003 |
| EP | 1 369 850 A1 | 12/2003 |
| EP | 1 471 506 A1 | 10/2004 |
| EP | 1 522 994 A1 | 4/2005 |
| EP | 1 605 445 A2 | 12/2005 |
| JP | 6150333 | 5/1994 |
| JP | 9-147487 | 6/1997 |
| JP | 09-160761 | 6/1997 |
| JP | 11025607 | 1/1999 |
| JP | 11-85413 | 3/1999 |
| JP | 11066607 | 3/1999 |
| JP | 11086451 | 3/1999 |
| JP | 2000-113458 | 4/2000 |
| JP | 2001256716 A | 9/2001 |
| JP | 2001-297447 | 10/2001 |
| JP | 2001-312861 | 11/2001 |
| JP | 2002-050040 | 2/2002 |
| JP | 2002-050053 | 2/2002 |
| JP | 2002050040 A | 2/2002 |
| JP | 2002-074855 | 3/2002 |
| JP | 2002074855 A | 3/2002 |
| JP | 2002124038 A | 4/2002 |
| JP | 2002-245625 | 8/2002 |
| JP | 2003-059062 | 2/2003 |
| JP | 2003-203341 | 7/2003 |
| JP | 2003-257026 | 9/2003 |
| JP | 2004-005772 | 1/2004 |
| JP | 2005-503623 | 2/2005 |
| JP | 2005-149655 | 6/2005 |
| JP | 2005-310358 | 11/2005 |
| JP | 2005-535061 | 11/2005 |
| JP | 2006-031907 | 2/2006 |
| JP | 2006-517711 | 7/2006 |
| JP | 2006-520990 | 9/2006 |
| JP | 2006520991 T | 9/2006 |
| KR | 1998-0011382 | 4/1998 |
| KR | 10-0183583 | 12/1998 |
| RU | 2225043 C1 | 2/2004 |
| TW | 430785 | 4/2001 |
| TW | 541522 | 9/2001 |
| TW | 460861 | 10/2001 |
| TW | 484127 | 4/2002 |
| TW | 200301465 | 7/2003 |
| TW | 200306535 | 11/2003 |
| WO | WO 97/13244 | 4/1997 |
| WO | WO 00/79525 A1 | 12/2000 |
| WO | WO 02/29791 A1 | 4/2002 |
| WO | WO 02/065462 A1 | 8/2002 |
| WO | WO 02/089123 A1 | 11/2002 |
| WO | WO 03/010519 A1 | 2/2003 |
| WO | WO 03/025935 A1 | 3/2003 |
| WO | WO 03/067581 A1 | 8/2003 |
| WO | WO 03/075265 A2 | 9/2003 |
| WO | WO 03/100775 | 12/2003 |
| WO | WO 03/102930 A1 | 12/2003 |
| WO | WO 03/105139 A1 | 12/2003 |
| WO | WO 2004/013845 A1 | 2/2004 |
| WO | WO 2004/072966 A1 | 8/2004 |
| WO | WO 2005/001819 A1 | 1/2005 |
| WO | WO 2005/017885 | 2/2005 |

OTHER PUBLICATIONS

U.S. Office Action dated Apr. 1, 2010 issued in U.S. Appl. No. 12/000,646.
U.S. Office Action dated Mar. 19, 2010 issued in U.S. Appl. No. 11/189,767.
U.S. Office Action dated Mar. 30, 2010 issued in U.S. Appl. No. 10/885,767.
Korean Notice of Allowance dated Feb. 21, 2011 in corresponding Korean Application No. 10-2003-0056543.
European Search Report dated Jan. 13, 2011 in corresponding European Application No. 10184078.
Taiwanese Office Action dated Jan. 10, 2011 in corresponding Taiwanese Application No. 96109003.
U.S. Office Action dated Feb. 2, 2011 in corresponding U.S. Appl. No. 12/000,646.
Russian Notice of Allowance dated Jun. 28, 2010 for RU Application No. 2007107082.
Japanese Office Action dated Sep. 10, 2010 issued in corresponding Japanese application No. 2007-523475.

US Office Action dated Oct. 5, 2010 issued in corresponding U.S. Appl. No. 10/885,767.
Japanese Office Action dated Nov. 9, 2010 issued in corresponding Japanese application No. 2007-513070.
Office Action issued Aug. 11, 2009 by the Japanese Patent Office in counterpart Japanese Patent Application No. 2007-047068.
Office Action issued Aug. 18, 2009 by the USPTO in counterpart U.S. Appl. No. 11/189,767.
Office Action issued Feb. 6, 2009 by the Chinese Patent Office for counterpart Chinese Patent Application No. 2007100059715.
Office Action issued Feb. 4, 2009 by the U.S. Patent and Trademark Office for counterpart U.S. Appl. No. 11/701,445.
Office Action issued Mar. 5, 2009 by the U.S. Patent and Trademark Office in counterpart U.S. Appl. No. 11/189,767.
Office Action for corresponding Japanese Application No. 2007-047071 dated Jun. 9, 2009.
Office Action issued Oct. 8, 2008 by the U.S. Patent and Trademark Office in related U.S. Appl. No. 11/440,047.
Office Action issued Oct. 7, 2008 by the U.S. Patent and Trademark Office in counterpart U.S. Appl. No. 11/189,767.
Office Action issued Dec. 23, 2008 by the U.S. Patent and Trademark Office in U.S. Appl. No. 10/885,767.
Office Action issued Oct. 10, 2008 by the Chinese Patent Office in Chinese Patent Application No. 2007100059787.
Office Action issued by the Chinese Patent Office on Dec. 14, 2007 in counterpart Chinese Patent Application No. 200580012716.2.
Office Action issued by the Japanese Patent Office on Jan. 25, 2008 in counterpart Japanese Patent Application No. 2006-523136.
Office Action issued Jan. 29, 2008 by the Indian Patent Office in counterpart Indian Patent Application No. 438/KOLNP/2006.
Office Action issued Jan. 25, 2008 by the Japanese Patent Office in counterpart Japanese Patent Application No. 2006-523136.
International Search Report issued Jan. 13, 2006 in corresponding International Patent Application No. PCT/KR2005/001403.
Search Report issued Apr. 15, 2008 by the European Patent Office in counterpart European Patent Application No. 07007644.3-2210.
Office Action issued Jun. 12, 2008 by the U.S. Patent and Trademark Office in counterpart U.S. Appl. No. 11/437,624.
Office Action issued Jun. 23, 2008 by the Russian Patent Office in counterpart Russian Patent Application No. 2004122413/28.
Search Report issued Jul. 2, 2008 by the European Patent Office in counterpart European Patent Application No. 07120273.3-2210.
Japanese Office Action dated Jun. 10, 2011 in corresponding Japanese Application No. 2007-513070.
Chinese Patent Gazette dated May 11, 2011 in corresponding Chinese Application No. 200580012716.2.
In re Rose, 105 USPQ 237 (CCPA 1955).
Office Action for corresponding U.S. Appl. No. 10/885,767 dated Mar. 2, 2012.
Tawainese Office Action dated May 11, 2012 for corresponding Tawainese Application No. 094115646 (with English translation).
Taiwanese Office Action dated May 31, 2012 for corresponding Taiwanese Application No. 094125448 (full english language translation provided).

* cited by examiner

RECORDING MEDIUM, READ/WRITE METHOD THEREOF AND READ/WRITE APPARATUS THEREOF

This application claims the benefit of the Korean Patent Application No. 10-2004-0034022, filed on May 13, 2004, and No. 10-2005-0039933, filed on May 13, 2005, which are hereby incorporated by reference as if fully set forth herein.

BACKGROUND OF THE INVENTION

1. Field of the Invention

The present invention relates to a recording medium and control information recording method thereof, and more particularly, to a method of recording read/write control information associated with a version of a corresponding recording medium as control information and a recording medium read/write method and apparatus using the recorded control information.

2. Discussion of the Related Art

Generally, an optical disc on which a large volume of data is recordable is widely used as an optical record medium. Recently, many efforts are made to develop a new high density optical record medium (HD-DVD), on which video data of high definition and audio data of high quality can be recorded and stored, such as a Blu-ray disc (hereinafter abbreviated BD) and the like.

The Blu-ray disc (BD) as a sort of a next generation HD-DVD technology is the next generation optical recording solution capable of storing data to remarkably surpass the storage capacity of the conventional DVD. And, the technology specifications of global standards for the BD are being established.

Various kinds of standard suggestions associated with the Blu-ray disc have been proposed. Specifically, various specifications for 2×(or higher)-rewritable Blu-ray disc (BD-RE) following 1×-rewritable Blu-ray disc, write-once Blu-ray disc (BD-R), and read-only Blu-ray disc (BD-ROM) have been prepared.

In spite of the Blu-ray disc of the same series, version of specified contents for the Blu-ray disc keeps being updated to keep up with the technological developments. For instance, disc specifications of the 1×-writable Blu-ray disc (BD-RE) keep extending like those of the 2×(or higher)-rewritable Blu-ray disc (BD-RE) do. Hence, the extending specification contents need to be managed as disc version information.

However, in reproducing a record of a disc of an upper version, even if the read/write is impossible or even if an error occurs in performing the read/write, a read/write apparatus designed suitable for a lower version according to an extension of a disc version keeps retrying the execution of the read/write to bring about a system error.

SUMMARY OF THE INVENTION

Accordingly, the present invention is directed to provide a recording medium and control information recording method thereof that substantially obviate one or more problems due to limitations and disadvantages of the related art.

An object of the present invention is to provide a method of recording read/write control information associated with a recording medium version as specified information within a recording medium management area.

Another object of the present invention is to provide a read/write method and apparatus using control information in performing read/write of a recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium, includes a management area having read/write control information recorded therein, wherein the control information may include version information of the corresponding recording medium and wherein the version information may include write compatibility version information and read compatibility version information.

In another aspect of the present invention, a read/write method of a recording medium includes a first step of reading out a first compatibility version information and a second compatibility version information from the recording medium, and a second step of deciding whether a write and/or read of the corresponding recording medium are compatible from the read-out version informations and performing the write and/or read if the write and/or read of the corresponding recording medium is compatible, wherein the first compatibility version information is more preferentially decided than the second compatibility version information.

In another aspect of the present invention, a read/write method of a recording medium includes the steps of reading out a first compatibility version information and a second compatibility version information from the recording medium, deciding a possibility of accessibility to the corresponding recording medium from the read-out first compatibility version information, deciding whether to access the recording medium according to a result of the decided possibility of the accessibility, and if it is decided from the first compatibility version information that the recording medium is accessible, deciding from the second compatibility version information whether data is writable on the corresponding recording medium and deciding whether to write the data according to a result of the corresponding decision, wherein the second compatibility version information can have a variable value within a specific value of the first compatibility version information.

In another aspect of the present invention, a read/write method of a recording medium includes the steps of reading out read/write control information including write compatibility version information from the recording medium, deciding a possibility of write compatibility of the corresponding recording medium from the read-out write compatibility version information, deciding whether a write at a specific speed is possible from write strategy information within the read-out control information if the write compatibility is in a bridge compatible state, and performing the write at the specific speed only if the recording medium is write-compatible to the specific speed as a result of the decision.

In another aspect of the present invention, a recording medium read/write apparatus includes a control unit reading out a first compatibility version information and a second compatibility version information from a recording medium, the control unit deciding a possibility of write compatibility and read compatibility of the corresponding recording medium from the read-out version informations, the control unit transmitting a read and/or write command based on a result of the decision, and a read/write unit performing a read and/or write according to the read and or write command from the control unit, wherein the first compatibility version information is decided prior to the second compatibility version information.

In a further aspect of the present invention, a recording medium, includes a management area having read/write control information recorded therein, wherein the control information may include version information of the corresponding recording medium, wherein the version information may include a first compatibility version information for deciding write and/or read compatibility of data and a second compatibility version information, and wherein the second compatibility version information may be changeable as long as the first compatibility version information is sustained.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
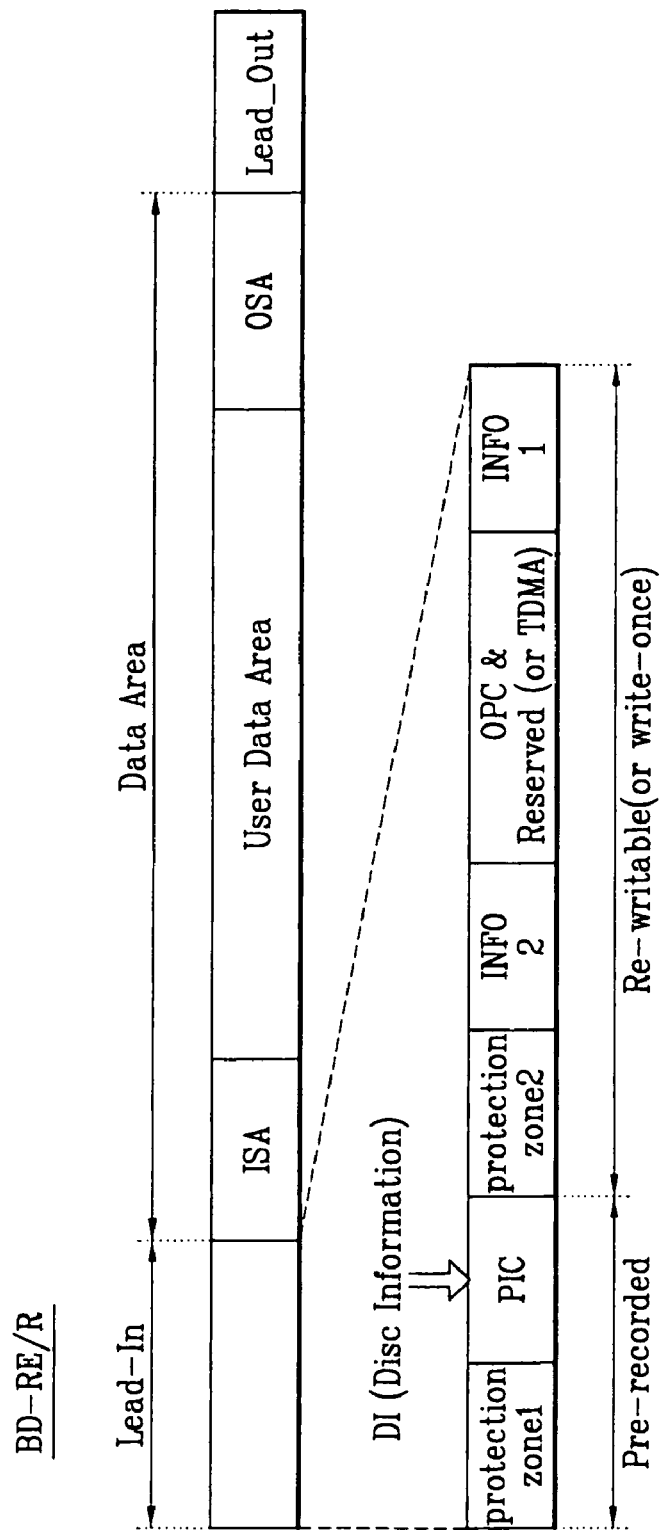
FIG. 1 is a structural diagram of a single-layered disc according to the present invention.

Reference will now be made in detail to the preferred embodiments of the present invention, examples of which are illustrated in the accompanying drawings. Wherever possible, the same reference numbers will be used throughout the drawings to refer to the same or like parts.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

A 'recording medium' in the present invention includes all kinds of data-recordable media such as an optical disc, a magnetic tape and the like regardless of its recording mechanism. For convenience of explanation of the present invention, a Blu-ray disc (BD) is exemplarily taken as an example of an optical disc. Yet, it is apparent that the technical concept of the present invention is applicable to other recording media in the same way.

'Control information' means various kinds of information for disc read/write of the Blu-ray disc and corresponds to 'disc information' written in a specific area of the Blu-ray disc (BD) or 'physical format information' written in DVD-RAM/-RW/+RW for example. First of all, 'disc information (hereinafter abbreviated DI)' corresponding to a case of a Blu-ray disc (BD) is explained for convenience as follows. Yet, it is apparent that the concept of the present invention is applicable to other discs of different formats (e.g., DVD series) used as the same concept in the same way.

The present invention relates to a method of recording read/write control information associated with disc version information. The disc version information is preferentially explained and a method of writing the disc version information as 'disc information (DI)' within a Blu-ray disc for control information is then explained in detail as follows.

First of all, regarding 'disc version information', as mentioned in the foregoing description, a disc version is newly defined each time new specification item is added according to the development of disc technology of the same series and a disc author records in a specific area of a disc information that the corresponding disc is prepared by what kind of version, whereby a read/write apparatus (shown in FIG. 7) for read/write of the corresponding disc looks up the disc version information written in the disc for read/write.

The present invention is characterized in that the disc information is recorded as mutually recognizable specified information between a disc and a read/write apparatus in recording the disc version information as control information (e.g., disc information (DI)). And, the present invention is characterized in utilizing the disc version information to carry out an efficient read/write control between a read/write apparatus and a disc differing from each other in version.

Figure 2:
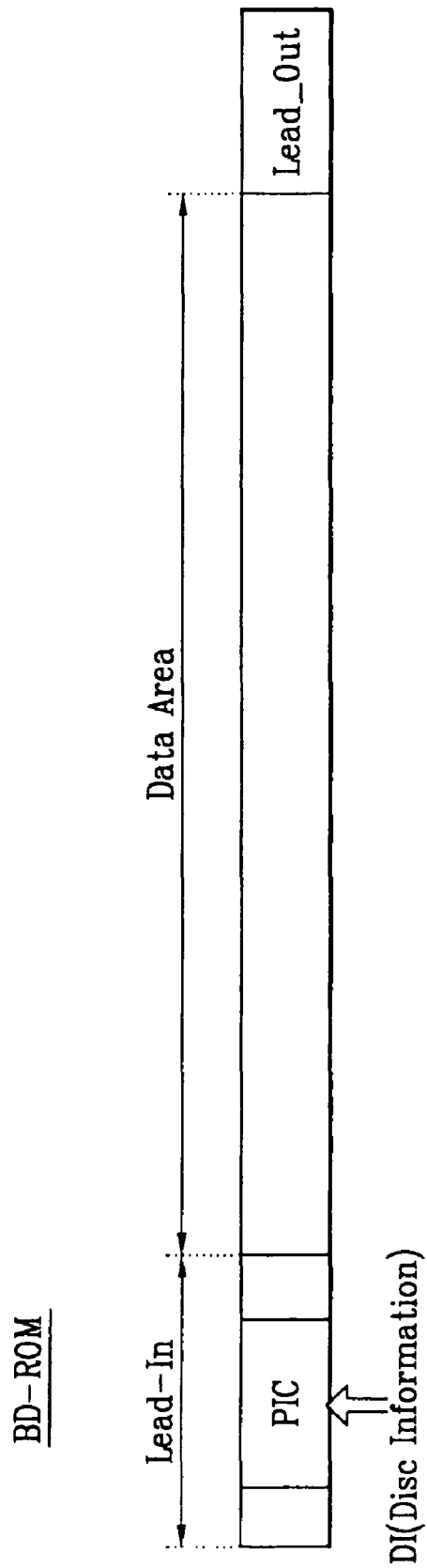
FIG. 2 is a structural diagram of a single-layered read-only disc according to the present invention.

FIG. 1 and FIG. 2 show structures of optical discs to which the present invention is applied. FIG. 1 shows a recordable Blu-ray disc (BD-RE/R) of a single layer having one recording layer. And, FIG. 2 shows a read-only Blu-ray disc (BD-ROM) of a single layer having one recording layer.

FIG. 1 is a structural diagram of a single-layered disc having one recording layer according to the present invention, in which disc information (DI) of a Blu-ray disc (BD) is written as control information in a disc.

Referring to FIG. 1, a lead-in area is provided as a management area on an inner circumference area of an optical disc of the present invention, whereas a lead-out area is provided as a management area on an outer circumference area of the optical disc. Specifically, a pre-recorded area and a rewritable or write-once area are separate from each other within the inner circumference area of the disc. The pre-recorded area is an area where data was already recorded in manufacturing the disc, whereby a user or system is unable to perform data recording on the pre-recorded area at all. Specifically, in the Blu-ray disc (BD), the pre-recorded area is named a PIC (permanent information and control data) area. And, disc information as information necessary for disc recording and the like is recorded in the PIC area. Yet, the disc information (DI) of the present invention need not exist within the PIC area necessarily. And, it is apparent that the disc information can be recorded within another management area.

In a data area, provided are a user data area where user's real data is recorded and spare areas ISA and OSA to replace a generated defect area. Specifically, a TDMA (temporary defect management area) for recording information of defect and general managements is provided within a management area in such a write-once optical disc as BD-R. In case of the re-writable BD-RE, the TDMA is unnecessary to remain as a reserved area.

FIG. 2 is a structural diagram of a single-layered read-only disc having one recording layer according to the present invention for explaining a location where disc information DI of the present invention is written.

In case of the read-only disc, the entire areas of the disc are configured with prerecorded areas. The disc information DI associated with the present invention can be written in a PIC area within a lead-in area, which is the same of the write-once disc shown in FIG. 1.

The present invention, as mentioned in FIG. 1 and FIG. 2, intends to provide a method of writing read/write control information associated with the disc version of the present invention efficiently as well as a method of recording write speed information for read/write and write strategy (hereinafter abbreviated WS) information as disc information (DI) recorded in the pre-recorded area. And, the method of writing the disc information (DI) of the present invention is explained in detail as follows.

Figure 3:
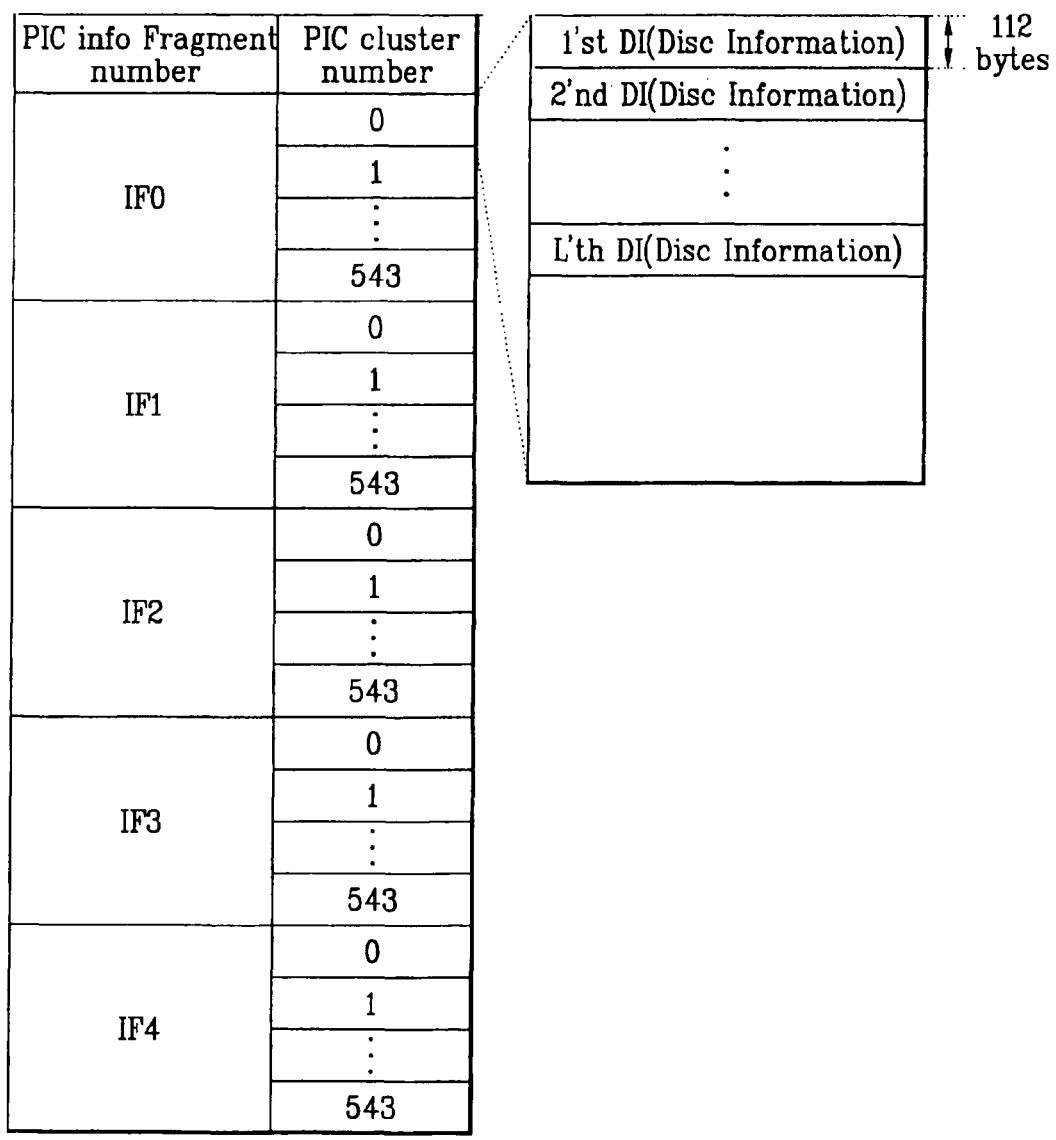
FIG. 3 is a diagram of a management area where control information of the present invention is written, in which control information is written in a corresponding area.

FIG. 3 is a structural diagram of a PIC area in the disc shown in FIG. 1 or FIG. 2.

Referring to FIG. 3, in a Blu-ray disc, 'one cluster' represents a minimal recording unit, five hundred forty-four clusters gather to construct one fragment as one upper recording unit, and total five fragments gather to form on PIC area.

Disc information DI is recorded in a front head cluster of a first fragment IF0. The disc information DI is plurally written per recording layer and velocity permitted by a corresponding optical disc, and one disc information DI can include one hundred twelve bytes. Specifically, the above-configured disc information is occasionally called a disc information (DI) frame. Moreover, the same contents of the disc information DI are repeatedly recorded in each front head cluster of the rest of the fragments, thereby being capable of coping with loss of the disc information DI.

Specifically, in the recordable disc shown in FIG. 1, the information representing the corresponding recording layer and recording velocity and the write strategy (WS) information corresponding to the recording layer and velocity are recorded within each disc information DI of the recordable disc as well as disc version information. Hence, such information is utilized in read/write of the corresponding optical disc, thereby enabling an efficient read/write.

Yet, since it is unable to perform a writing operation on the read-only disc shown in FIG. 2, the recording velocity information and the write strategy (WS) information for disc recording will not be included within the disc information DI.

A method of recording read/write control information associated with a disc version according to the present invention is explained in detail through various embodiments with reference to FIGS. 4A to 8 as follows. For convenience of explanation, a recordable disc is taken as an example. Yet, as mentioned in the foregoing description, the method is applicable to a read-only disc in the same way as well.

Figure 4A:
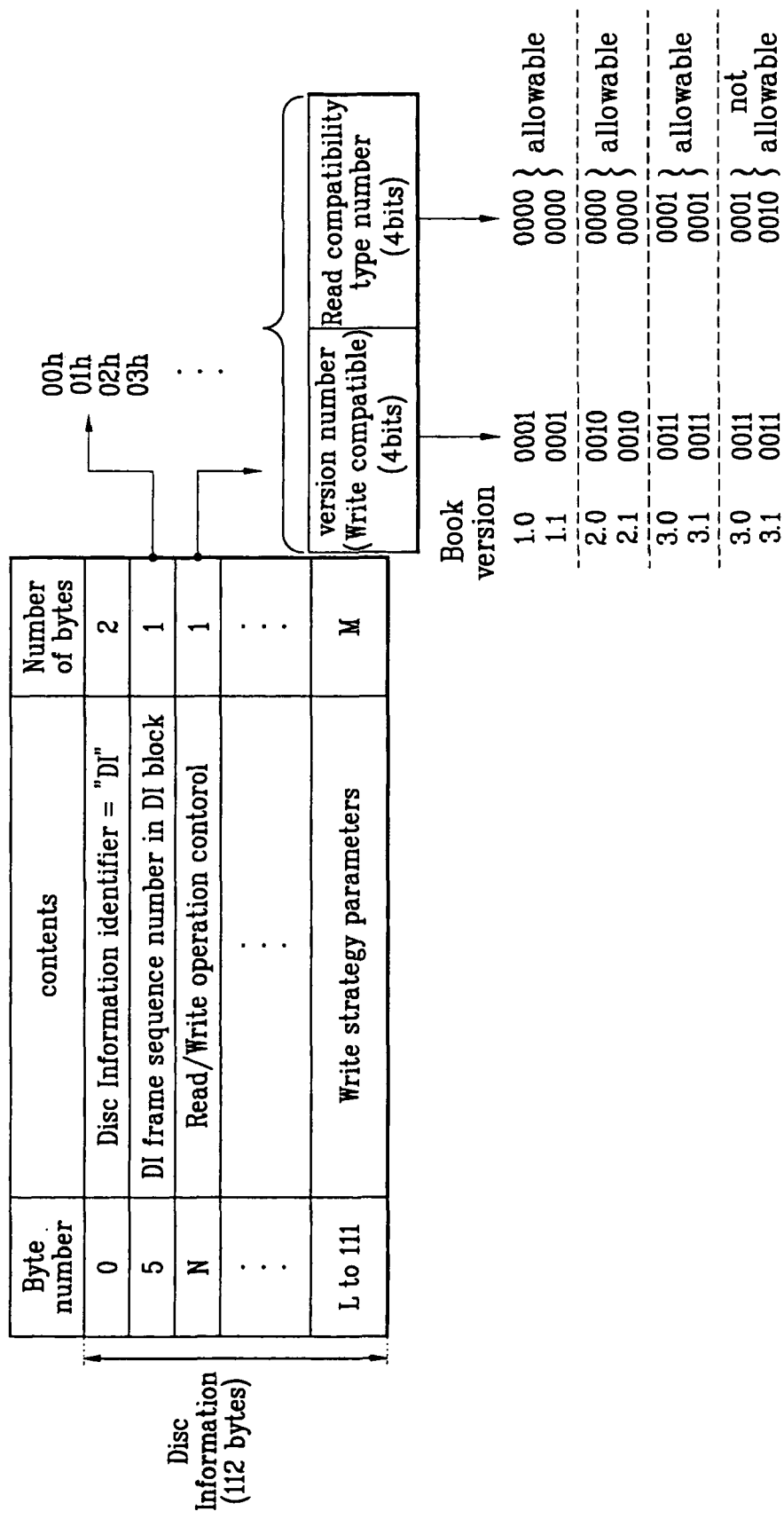
FIG. 4A and FIG. 4B are diagrams of a method of writing control information according to a first embodiment of the present invention.
Figure 4B:
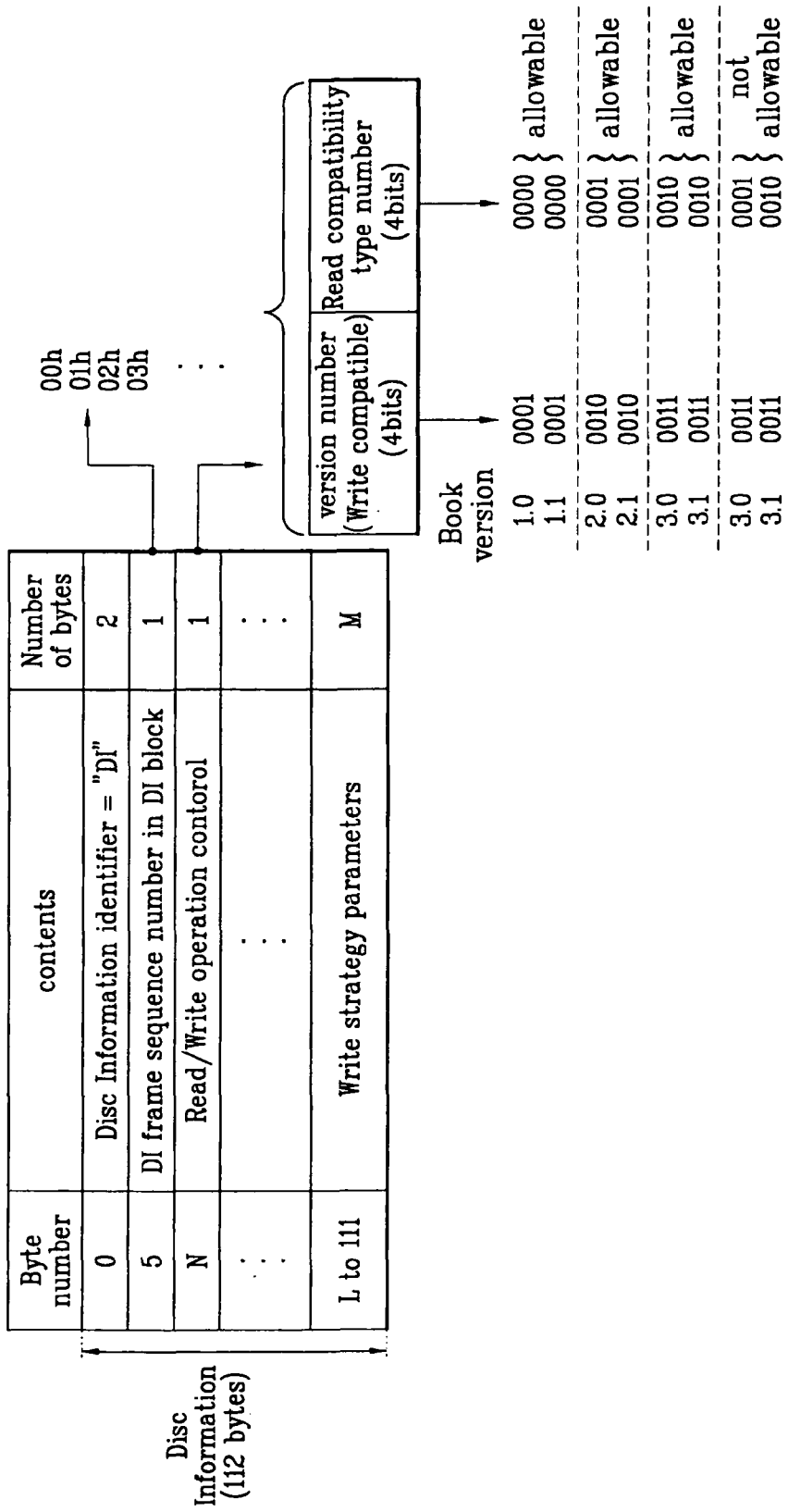

FIG. 4A and FIG. 4B show a method of writing disc information (DI) as control information in an optical disc according to a first embodiment of the present invention, in which an area for recording read/write control information therein is separately allocated.

Namely, an area for recording at least one disc information DI therein is provided within an optical disc, and an order of each disc information DI is decided according to its sequence number to be recorded by one byte. For instance, the corresponding information is recorded at a fifth byte within the disc information DI, is named 'DI frame sequence number in DI block', and is briefly represented by '00h, 01h, 02h, . . . '. Namely, if the information of the fifth byte is '00h', it means first disc information. If the information of the fifth byte is '03h', it means fourth disc information.

Write strategy (WS) information interoperating with the recording velocity meant by the corresponding disc information DI is recorded in an area named a 'write strategy parameters' field by $(L\sim 111)^{th}$ bytes for the disc information DI, and read/write control information is recorded in an area named a 'Read/Write operation control' field by $N^{th}$ byte as the disc information DI.

The 'Read/Write operation control' field is divided into two parts, in which 'recordable version number' is recorded in first four bits and second four bits are allocated as an area for recording 'read compatibility type number' therein.

The 'Read/Write operation control' field is explained in detail as follows.

First of all, main version information of a corresponding disc is represented by utilizing the 'recordable version number' within the 'Read/Write operation control' field. For instance, if a disc corresponds to version1.xx (V1.xx), it is represented as 'version number=0001'. If the disc corresponds to version2.xx (V2.xx), it is represented as 'version number=0010'. And, if the disc corresponds to version3.xx (V3.xx), it is represented as 'version number=0011'.

Hence, if a disc of a higher version written as 'version number=0010 (V2.xx) is loaded in a read/write apparatus of a lower version (V1.xx), the read/write apparatus of the lower version should not perform a recording on the loaded disc of higher version. So, in case that the higher-version disc is loaded, the read/write apparatus confirms the corresponding disc version information written in 'recordable version information (version number)' field within the loaded disc not to perform an access operation for performing a write on the corresponding disc but to instantly inform a user and the like that the corresponding disc is not recordable in response.

Namely, the read/write apparatus is allowed to execute a write on the corresponding disc only if a disc having a write-allowable version is loaded. And, the apparatus reads the corresponding control information from the disc information DI.

And, 'Read compatibility type number' within the 'Read/Write operation control' field, which is the information indicating whether a reproduction is allowable or not, has a meaning that reproduction of a disc having 'Read compatibility type number' higher than that of the read/write apparatus is prohibited. So, the read/write apparatus confirms the corresponding disc version information written in 'Read compatibility type number' field within the loaded disc not to perform an access operation for performing a write on the corresponding disc but to instantly inform a user and the like that the corresponding disc is not readable in response.

The 'Read compatibility type number' preferably has the following restriction conditions.

Namely, within the same recordable version information (version number), a value of 'Read compatibility type number' is not changed but maintains the same. For instance, it means that 'Read compatibility type number' of each disc is not allowed to have a different value '0001' or '0010' in the same recordable version information ('version number= 0011') indicating the version3.xx.

In other words, if the read compatibility information (Read compatibility type number) becomes '0001' or '0010', the version information can represent the same recordable version number ('version number=0011') that indicates version3.xx (V3.xx, x: 0~9) by taking a value of the read compatibility information (Read compatibility type number) as a reference. Namely, the read compatibility information (Read compatibility type number) should be decided prior to the version information to device the compatibility, and more particularly, backward compatibility. And, the version information value can changed as long as the read compatibility information value is sustained.

A method of deciding the compatibility will be explained in detain with reference to FIG. 8 or FIG. 9.

FIG. 4B is provided for additionally explaining 'Read compatibility type number' in the same embodiment of FIG. 4A.

Namely, in FIG. 4A, in case that the recordable version information (version number) corresponds to '0001' (V1.xx) or '0010' (V2.xx), the same read compatibility information (Read compatibility type number=0000) is applicable. Yet, in FIG. 4B, in case that the recordable version information (version number) corresponds to '0001' (V1.xx) or '0010' (V2.xx), read compatibility information (Read compatibility type number=0000) and read compatibility information (Read compatibility type number=0001) are respectively applicable.

Yet, as shown in FIG. 4A or FIG. 4B, in case that the recordable version information (version number) is represented by the higher version information (V1.xx, V2.xx, V3.xx, . . . ) only and if the case is made impossible to be recordable with the information only, there occurs a confusion in a 'bridge compatible state'.

Namely, in case that a version1.1 (V1.1) is the 1×/2× recording standard and if the standard for supporting a new 4×-speed standard is unable to meet 1×~4× speed overall, the 'bridge compatible state' means the standard which allows 2× to be partially compatible and 1×-speed to be incompatible by regulating version2.0 (V2.0) as 2×/4× speed and by making 2× to be compatible with the version1.1 (V1.1) standard.

Hence, in case of the 'bridge compatible state', it cannot be completely decided as 'write prohibit' but is made recordable for a partially compatible part. For this, if read compatibility is sustained in designing the read/write apparatus, the read/write apparatus reproduces the disc information (DI) to read the recording condition (e.g., write strategy, write strategy parameters, etc.) of each velocity and decides whether the velocity is allowable for write. This will be explained in detail with reference to FIG. 8 later.

Figure 5:
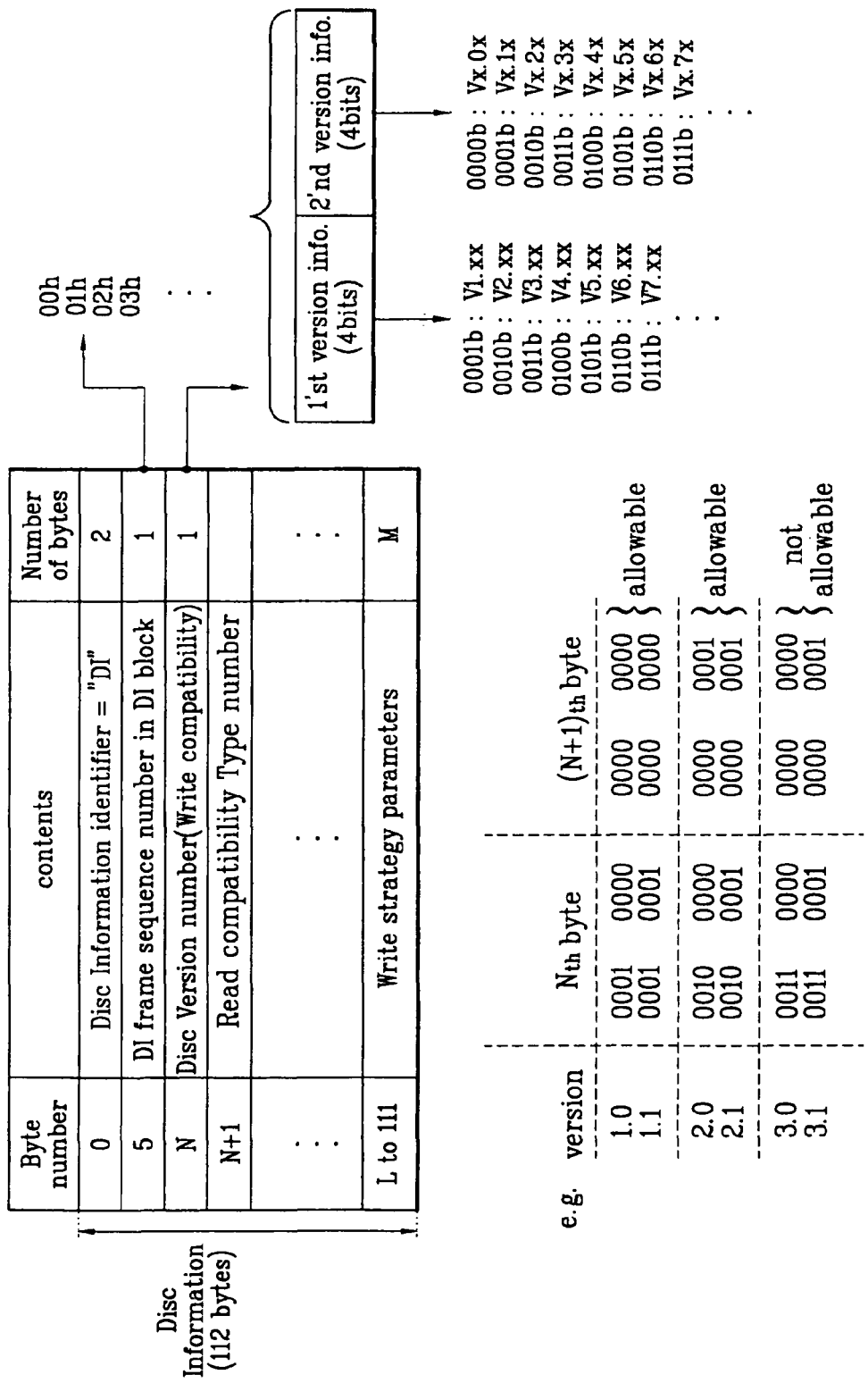
FIG. 5 is a diagram of a method of writing control information according to a second embodiment of the present invention.

FIG. 5 is a diagram of a method of writing disc information (DI) of an optical disc as control information according to a second embodiment of the present invention, in which an area for recording read/write control information therein is separately allocated.

Referring to FIG. 5, at least one disc information DI is recorded within a disc and an order of each disc information DI is decided according to its sequence number to be recorded by one byte. For instance, the corresponding information is recorded at a fifth byte within the disc information DI, is named 'DI frame sequence number in DI block' field, and is briefly represented by '00h, 01h, 02h, . . . '. Namely, if the information of the fifth byte is '00h', it means first disc information DI. If the information of the fifth byte is '03h', it means fourth disc information DI.

$L^{th}$~$111^{th}$ bytes within the disc information DI are named a 'write strategy parameters' field. And, write strategy (WS) information interoperating with the recording velocity meant by the corresponding disc information DI is recorded in the 'write strategy parameters' field. An Nth byte is named a 'Disc version number (Write compatibility)' field and write control information of the read/write control information of the present invention is recorded in the 'Disc version number (Write compatibility)' field. And, an (N+1)th byte is named a 'Read compatibility type number' field and read control information of the read/write control information of the present invention is recorded in the 'Read compatibility type number' field.

Namely, compared to the first embodiment (FIG. 4A, FIG. 4B) according to the present invention, the second embodiment (FIG. 5) according to the present invention extends the 'Disc version number (Write compatibility)' field to indicate a lower version as well as a higher version.

The 'Disc version number (Write compatibility)' field is divided into two parts, in which 'higher version information ($1^{st}$ version info)' is recorded in first four bits and 'lower version information ($2^{nd}$ version info)' is recorded in second four bits.

In case of version1.0 (V1.0), the 'Disc version number (Write compatibility) field is set to '0001 0000'. In case of version1.1 (V1.1), the 'Disc version number (Write compatibility) field is set to '0001 0001'. In case of version3.1 (V3.1), the 'Disc version number (Write compatibility) field is set to '0011 0001'.

By the above definition, the disc version can be correctly indicated. And, in deciding a write possibility with reference to the version information, the read/write apparatus can enhance its reliance.

Yet, in the second embodiment of the present invention as well as the first embodiment, the 'Read compatibility type number' field preferably has the aforesaid restriction condition.

Namely, in case the higher version information of the recordable version (version number) is like, the value of 'Read compatibility type number' is not changed but maintains the same.

Figure 6A:
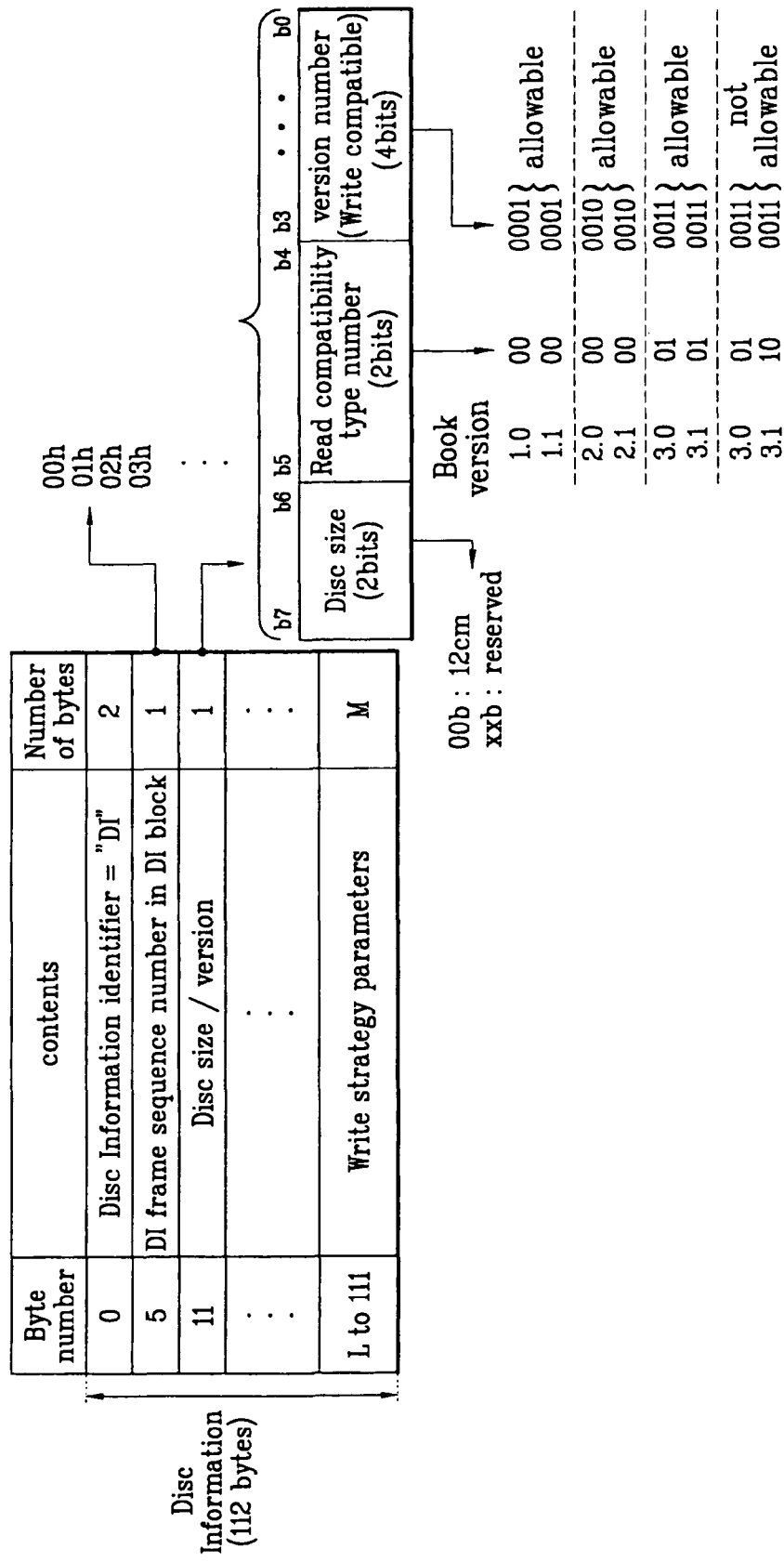
FIG. 6A and FIG. 6B are diagrams of a method of writing control information according to a third embodiment of the present invention.

FIG. 6A shows a method of recording disc information DI of an optical disc as control information according to a third embodiment of the present invention, in which an area for recording Read/Write control information associated with disc version information sustains compatibility with a disc information (DI) recording method in the 1× recordable Blu-ray disc (BD-RE) which is currently being discussed.

Referring to FIG. 6A, an $11^{th}$ byte of disc information DI is named a 'Disc size/version' field for recording disc size information and version information therein. 'size information' is recorded in first two bits b7 and b6, 'Read compatibility type number' is recorded in second two bits b5 and b4, and 'recordable version information (version number (Write compatibility))' is recorded in third four bits b3 to b0.

The currently discussed Blu-ray disc (BD) has a size of 12 cm only. So, if the disc size information corresponds to '00b', it means a case of 12 cm. And, the rest is left as a reserved area for a disc size (e.g., 8 cm) that will be added as a standard later.

If the $11^{th}$ byte is set to '00 00 0001b', it means that the disc has a size of 12 cm, that the 'Read compatibility type number' type is '00', and that the recordable version information (version number) becomes '0001'.

In the third embodiment of the present invention (FIG. 6), the read compatible information (Read compatibility type number) has the restriction condition having the same value in the same recordable version information (version number). To solve the problem of the 'bridge compatible state', the final recordable possibility should be decided with reference to other information (e.g., recording velocity information, etc.) in designing a read/write apparatus.

Figure 6B:
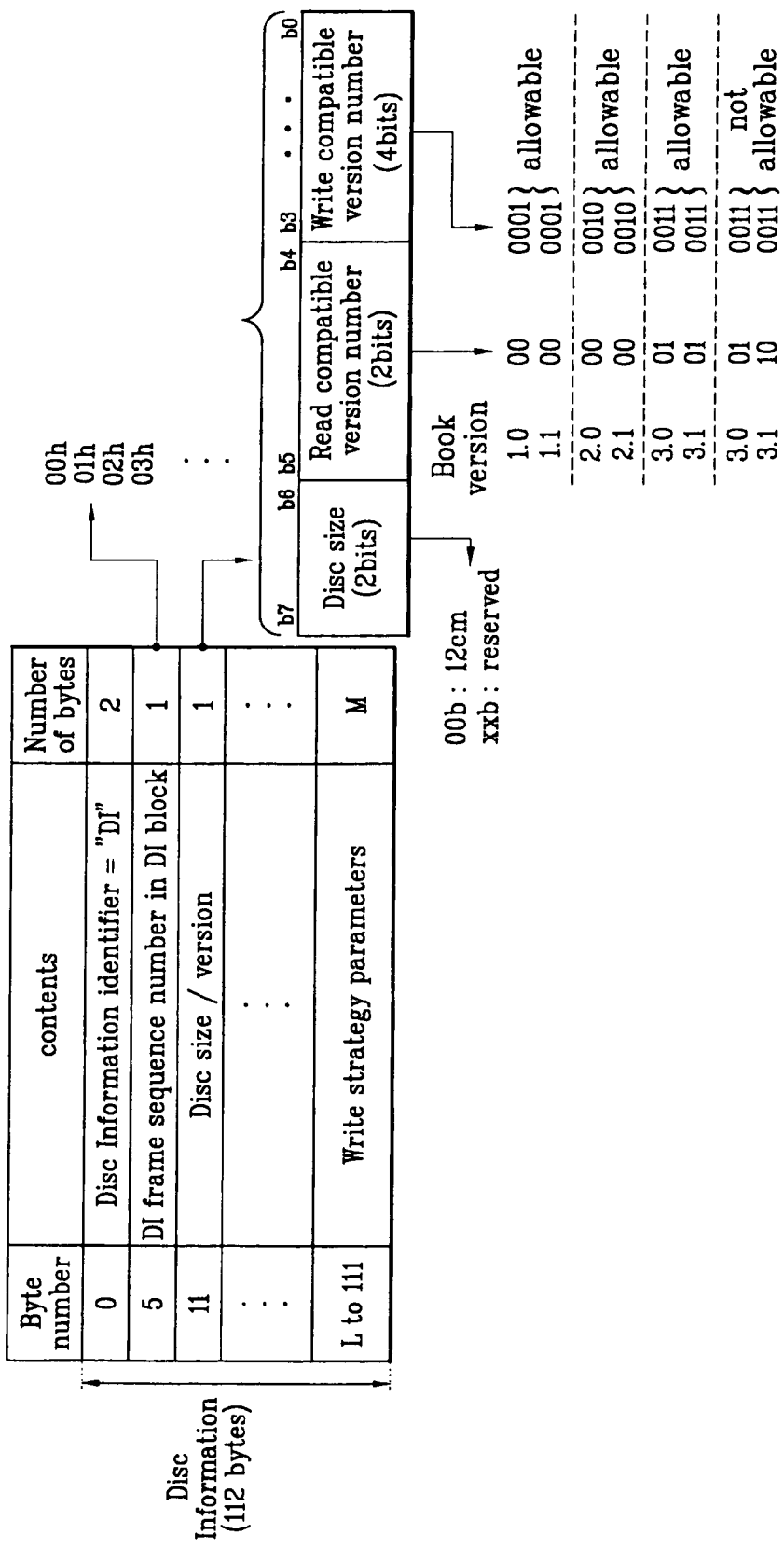

FIG. 6B shows an example modified from FIG. 6A, in which field names are changed in part. Namely, the 'read compatibility information (Read compatibility type number' in FIG. 6A is changed into 'read compatible version information (Read compatible version number)' and the 'write compatible version information (version number)' is changed into 'write compatible version information (write compatible version number)'.

Hence, it is apparent that the above modifications can be developed into various name modifications. For instance, the 'read compatibility information (Read compatibility type number)' in FIG. 6A is simply modified into 'class information (Class)' and the 'write compatible version information (version number)' can be modified into 'version information (Version). In this case, the 'class information (Class)' becomes information indicating a read-compatible disc version and the 'version information (Version)' becomes information indicating a write-compatible disc version.

Figure 7:
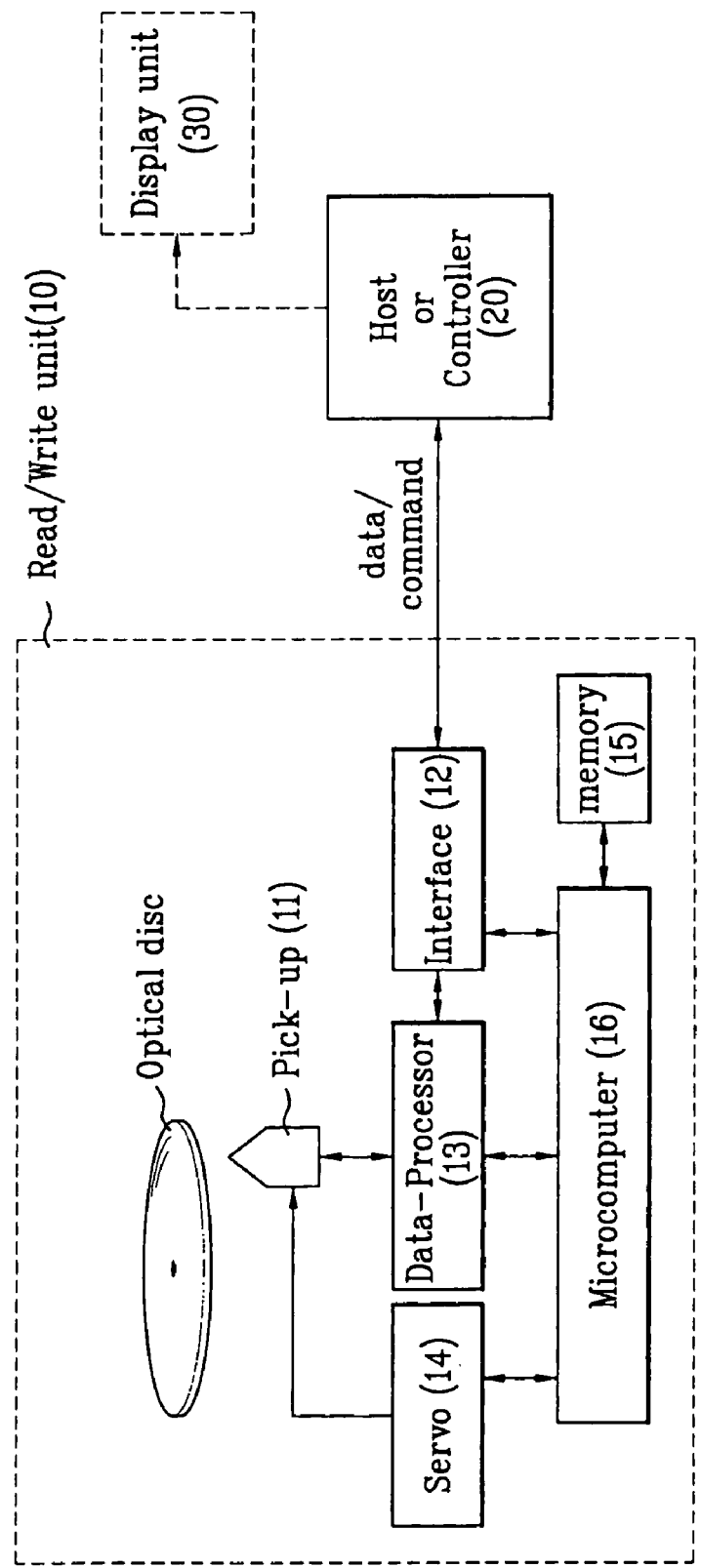
FIG. 7 is a diagram of an optical disc read/write apparatus applicable to the present invention.

FIG. 7 is a diagram of a read/write apparatus in an optical disc applicable to the present invention.

Referring to FIG. 7, a read/write apparatus in an optical disc applicable to the present invention includes a read/write unit 10 carrying out a read/write of the optical disc and a control unit 20 controlling the read/write unit 10. The control unit 20 gives a read or write command for a specific area, and the read/write unit 10 caries out the read/write on the specific area according to the command of the control unit 20.

Specifically, the read/write unit 10 includes an interface unit 12 performing communications with an external device, a pickup unit 11 directly writing data on the optical disc or reading the data, a data processor 13 receiving a read signal from the pickup unit 11 to restore into a necessary signal value or modulating to deliver a signal to be recorded into a signal to be written on the optical disc, a servo unit 14 reading out a signal from the optical disc correctly or controlling the pickup unit 11 to record a signal on the optical disc correctly, a memory 15 temporarily storing data and various kinds of information including management information, and a microcomputer 16 responsible for controlling the above-described elements within the read/write unit 10.

Apart from the read/write apparatus, a display device 30 displaying a signal read via the read/write unit 10 or providing a final user with information via the control unit 20 may be provided.

Figure 8:
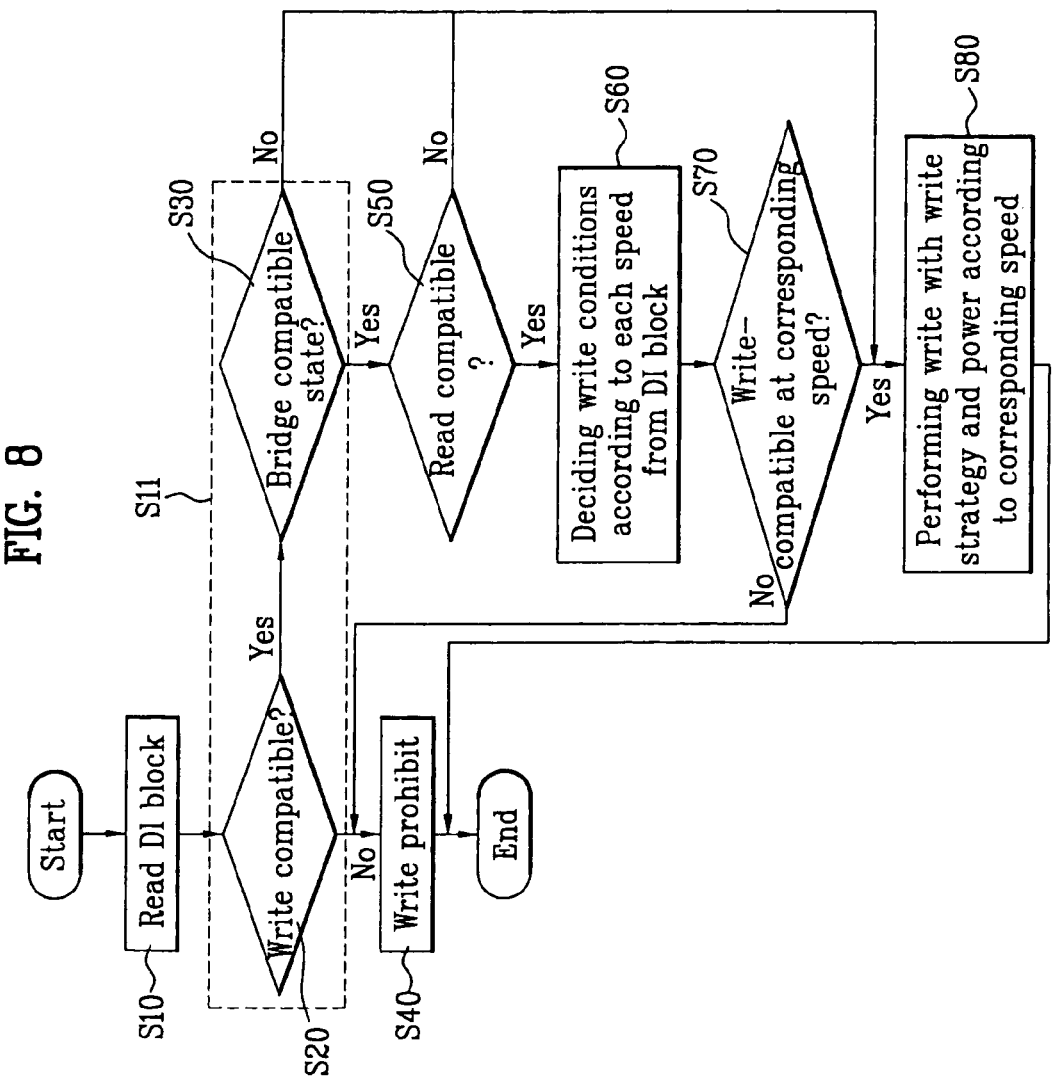
FIG. 8 and FIG. 9 are flowcharts of an optical disc read/write method applicable to the present invention.
Figure 9:
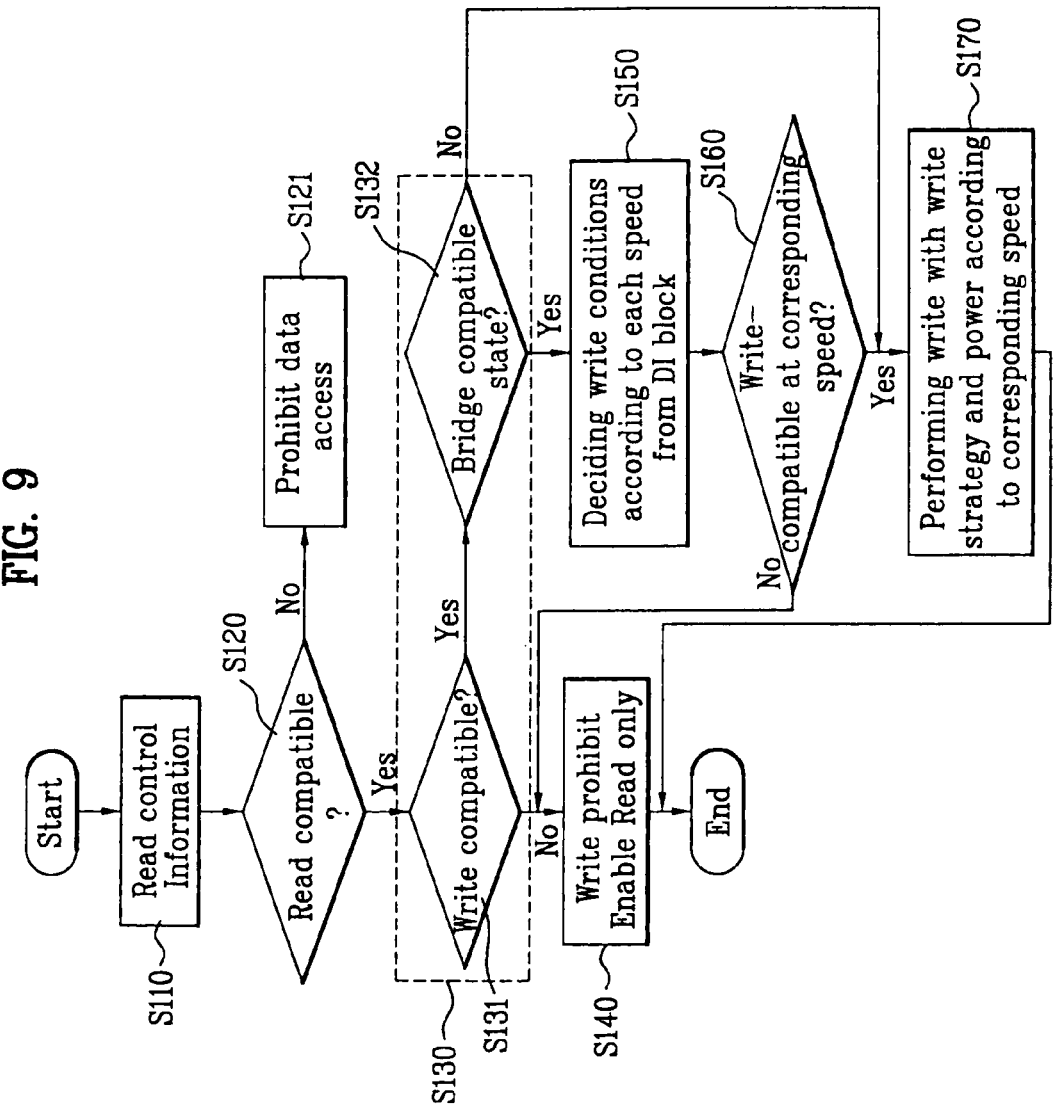

FIG. 8 and FIG. 9 are flowcharts of an optical disc read/write method applicable to the present invention, respectively. FIG. 8 preferentially concerns the confirmation of a presence or non-presence of write compatibility, whereas FIG. 9 concerns the confirmation of the presence or non-presence of write compatibility after completion of confirming a presence or non-presence of read compatibility.

Referring to FIG. 8, once an optical disc is loaded in the read/write apparatus, all management information within the disc is read out to be temporarily stored in the memory 15 of the read/write unit 10. And, the management information is utilized for the read/write of the optical disc. Specifically, the management information stored in the memory 15 includes read/write control information of the present invention. For instance, the read/write control information is provided as disc information (DI). Thereafter, the microcomputer 16 decides a presence or non-presence of read/write compatibility in the following manner.

Specifically, the read-out disc read/write control information can be the information having various names as explained in the first to third embodiments of the present invention. Form the various kinds of information, it can be decided whether the currently loaded disc is recordable (S11).

Specifically, in the step S11, it is checked whether the recordable case is in 'Bridge compatible state' (S30) as well as the write compatibility decision (S20).

Hence, if it is decided in the step S11 that the optical disc is not recordable, the read/write apparatus prohibits further recording (S40). If it is the case that the read is possible from the read compatibility information (Read compatibility), the read is performed on the corresponding disc only.

And, if it is decided in the step S11 that the disc is the recordable optical disc and that it is not in the 'Bridge compatible' state, it corresponds to the case enabling a normal recording. So, the read/write apparatus can perform recording with reference to write strategy information (write strategy, write strategy parameters, etc.) within the disc information (DI) (S80).

Moreover, if it is decided in the step S11 that the disc is the recordable optical disc and that it is in the 'Bridge compatible' state, the read/write apparatus confirms from the read compatibility information (Read compatible) whether it is in a read compatible state (S50). In case of the read compatibility, a write condition for each speed within the disc information (DI) is decided to re-decide the possibility of the write compatibility at the corresponding speed (S60, S70).

According to the result of the step S70, if the write compatibility is decided possible, the read/write apparatus carries out the normal write. If the write compatibility is decided impossible (S40), the read/write apparatus prohibits the data access for write, thereby preventing the system errors that may be generated from the disc error or the abnormal write trial.

Referring to FIG. 9, once an optical disc is loaded in the read/write apparatus, all management information within the disc is read out to be temporarily stored in the memory 15 of the read/write unit 10. And, the management information is utilized for the read/write of the optical disc (S110). Specifically, the management information stored in the memory 15 includes read/write control information of the present invention. Specifically, the read/write control information is provided as disc information (DI). Thereafter, the microcomputer decides a presence or non-presence of read/write compatibility in the following manner.

First of all, it is checked whether the read of the corresponding disc is possible from the 'read-compatible information (Read compatibility) among the read-out control information (S120). If the read is impossible, an access to the data area within the loaded disc is prohibited and the write is prohibited as well (S121).

If the read compatibility is possible in the step S120, it is checked whether the write of the corresponding disc is possible from the 'write compatible information (Write compatibility)' among the read-out control information (S130).

Specifically, in the step S130, it should be decided whether the write-compatible case is in the 'Bridge compatible' state (S132), if necessary, as well as whether the write is compatible (S131).

Hence, if it is decided in the step S31 that the optical disc is not write-compatible, the read/write apparatus prohibits a further write and enables the read only (S140).

If the optical disc is decided as write-compatible in the step S131 and if it is decided in the step S132 that the write-compatible case is not in the 'Bridge compatible' state, the read/write apparatus decides that it is normally write-compatible to perform normal write within reference to write strategy information (e.g., write strategy, write strategy parameters, etc.) and the like within the disc information (DI) (S170).

If the optical disc is decided as write-compatible in the step S131 and if it is decided in the step S132 that the write-compatible case is in the 'Bridge compatible' state, the read/write apparatus checks a write condition for each speed within the disc information (DI) (S150) and decides again whether the write compatibility at the corresponding speed is possible (S160).

According to the result of the step S160, if the write compatibility is decided possible, the read/write apparatus carries out the normal write with reference to the write strategy information within the corresponding DI (S170). If the write compatibility is decided impossible, the read/write apparatus prohibits the write on the disc but enables the read only (S140).

Accordingly, the read/write apparatus is facilitated to confirm the possibility of the write and/or read of the corresponding disc from the read/write control information of the loaded disc, thereby preventing the system errors that may be generated from the abnormal write/read trial.

And, if receiving from the microcomputer 16 a notification indicating that the normal write and/or read of the loaded disc is not possible the control unit 20, the control unit 20 preferably notifies an announcement message, which indicates the write and/or read is impossible, to a user via the display device 30, if necessary.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:

1. A recording medium comprising:
    a management area having control information usable for recording or reading data on or from the recording medium, the control information includes recording velocity information for indicating a recording velocity, size information for indicating a size of the recording medium, first version information for determining a possibility of access for recording and/or reading the data, and second version information for determining a possibility of recording the data, wherein the second version information is set to be identified after identifying the first version information,
    wherein the size information, the first version information and the second version information are represented by 2 bits, 2 bits and 4 bits within one byte information, respectively.

2. The recording medium of claim 1, wherein the size information indicates that a diameter of the recording medium is 12 cm or 8 cm.

3. The recording medium of claim 1, wherein the type of the recording medium is one of a read-only optical disc, a rewritable optical disc and a write-once optical disc.

4. The recording medium of claim 1, wherein the control information further comprises write strategy information for indicating write strategy parameters for recording or reading the data and sequence information indicating a sequence number of the control information associated with the recording velocity or the write strategy information.

5. The recording medium of claim 4, wherein the recording medium includes a plurality of recording layers, and each control information is usable for a specific recording velocity, the write strategy information and a specific recording layer.

6. The recording medium of claim 1, wherein a value of the first compatibility version information is set to be increased for a new-versioned recording medium incompatible with a previous-versioned recording medium.

7. A method for recording or reading data on or from a recording medium, comprising:
    reading control information usable for recording or reading data on or from the recording medium, the control information includes recording velocity information for indicating a recording velocity, size information for indicating a size of the recording medium, first version information for determining a possibility of access for recording and/or reading the data, and second version information for determining a possibility of recording the data;
    identifying the first version information and selectively identifying the second version information based on the result of identifying the first version information; and
    determining whether it is possible to access recording or reading the data on or from the recording medium based at least one of the identified first version information and second version information,
    wherein the size information, the first version information and the second version information are represented by 2 bits, 2 bits and 4 bits within one byte information, respectively.

8. The method of claim 7, wherein the determining step comprising
    a step (1) of deciding whether it is possible for a pickup to access to the recording medium based on the first version information; and
    a step (2) of deciding a possibility of the write of the data based on the second version information if it is possible to access to the recording medium as a result of the decision in the step (1).

9. The method of claim 7, wherein the type of the recording medium is one of a read-only optical disc, a rewritable optical disc and a write-once optical disc, wherein the determining step including specifying the type of the recording medium.

10. The method of claim 7, wherein the control information further comprises write strategy information for indicating write strategy parameters for recording or reading the data and sequence information indicating a sequence number of the control information associated with the recording velocity or the write strategy information, and
    wherein the recording medium includes a plurality of recording layers, and each control information is usable for a specific recording velocity, the write strategy information and a specific recording layer.

11. An apparatus for recording or reading data on or from a recording medium, comprising:
    a memory configured to store control information usable for recording or reading data on or from the recording medium, the control information includes recording velocity information for indicating a recording velocity, size information for indicating a size of the recording medium, first version information for determining a possibility of access for recording and/or reading the data, and second version information for determining a possibility of recording the data;
    a pickup configured to record or read the data on or from the recording medium; and
    a controller, operatively coupled to the memory and the pickup, configured to read the control information from the memory; the controller configured to identify the first version information and selectively identify the second version information based on the result of identifying the first version information; and the controller configured to determine whether it is possible for the pickup to access for recording or reading the data on or from the recording medium based on at least one of the identified first version information and second version information, wherein the size information, the first version information and the second version information are represented by 2 bits, 2 bits and 4 bits within one byte information, respectively.

12. The apparatus of claim 11, wherein the controller is configured to decide whether it is possible for the pickup to access to the recording medium based on the first version information, and to decide a possibility of the write of the data based on the second version information if it is possible to access to the recording medium.

13. The method of claim 11, wherein the type of the recording medium is one of a read-only optical disc, a rewritable optical disc and a write-once optical disc, wherein the controller is configured to identify the type of the recording medium.

14. An apparatus for recording or reading data on or from a recording medium, comprising:
 a pickup configured to record or read data on or from the recording medium; and
 a controller, operatively coupled to the pickup, configured to control the pickup to read control information usable for recording or reading data on or from the recording medium, the control information includes recording velocity information for indicating a recording velocity, size information for indicating a size of the recording medium, first version information for determining a possibility of access for recording and/or reading the data, and second version information for determining a possibility of recording the data; the controller configured to identify the first version information and selectively identify the second version information based on the result of identifying the first version information; and the controller configured to determine whether it is possible to access for recording or reading the data on or from the recording medium based on at least one of the identified first version information and second version information, wherein the size information, the first version information and the second version information are represented by 2 bits, 2 bits and 4 bits within one byte information, respectively.

15. The apparatus of claim 14, further comprising a memory to store the control information, and
 wherein the controller is configured to store the control information read by the pickup in the memory.

16. The apparatus of claim 14, wherein the controller is configured to decide whether it is possible for the pickup to access to the recording medium based on the first version information, and to decide a possibility of the write of the data based on the second version information if it is possible to access to the recording medium.

* * * * *

UNITED STATES PATENT AND TRADEMARK OFFICE
CERTIFICATE OF CORRECTION

PATENT NO. : 8,279,734 B2  
APPLICATION NO. : 12/656844  
DATED : October 2, 2012  
INVENTOR(S) : Jin Yong Kim Page 1 of 1

It is certified that error appears in the above-identified patent and that said Letters Patent is hereby corrected as shown below:

Title page, insert

-- Foreign Application Priority Data

(30) May 13, 2004 (KR).....................................10-2004-0034022

May 13, 2005 (KR).................................10-2005-0039933 --

Signed and Sealed this  
Eighteenth Day of December, 2012

David J. Kappos  
*Director of the United States Patent and Trademark Office*